United States Patent Office 2,750,383
Patented June 12, 1956

2,750,383

ACYL DERIVATIVES OF 3,3-DIMETHYL PIPERAZINEDIONE

Sidney R. Safir, River Edge, N. J., and Joseph J. Hlavka, Nanuet, N. Y., assignors to American Cyanamid Company, New York, N. Y., a corporation of Maine No Drawing. Application March 10, 1954,
Serial No. 415,436

15 Claims. (Cl. 260—268)

This invention relates to a series of new organic compounds. More particularly, it relates to 3,3-dimethyl-2,6-piperazinedione, $N^4$-derivatives thereof and methods for their manufacture.

The compounds of this invention may be represented by the following formula:

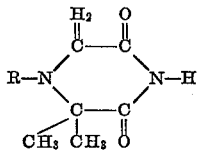

wherein R is a member selected from the group consisting of hydrogen atoms, carbaralkyloxy, aryloxyalkanoyl, carbalkoxy, aralkanoyl, and dihaloalkanoyl radicals such as for example carbobenzyloxy, phenoxyacetyl, β-phenylpropionyl, dichloroacetyl and carbethoxy.

One of the objects of the present invention is to provide novel derivatives of 3,3-dimethyl piperazinediones and methods for their preparation.

Another object of this invention is to provide a method for cyclizing isomeric monoester-monoamides of α-[(N-carbobenzyloxy - N - carboxymethyl) - amino] - isobutyric acid to the corresponding 4-carbobenzyloxy-3,3-dimethyl-2,6-piperazinedione through the intramolecular elimination of the elements of methyl alcohol.

$N^4$-substituted-3,3-dimethyl piperazinediones of this invention are useful compounds in the fields of medicine, agriculture, and pharmaceuticals. It has been discovered that these compounds possess desirable pharmacological properties and are capable of producing pronounced anaesthetic and anti-convulsant activity in man and lower animals with minimal side effects.

While it is not intended that this invention be limited to 3,3-dimethyl piperazinediones made by any specific method, a particularly convenient route for synthesis has been discovered and this new process also constitutes a part of this invention. The new method comprises reacting the isomeric monomethyl ester-monoamides of α - [(N - carbobenzyloxy - N - carboxymethyl) - amino]- isobutyric acid with a strong base, resulting in the cyclization of the monomethyl ester-monoamide through the intramolecular elimination of the elements of methyl alcohol. The isomeric monomethyl ester-monoamides employed for this cyclization are formed by a series of chemical transformations starting with glycine ethyl ester and comprising carbobenzyloxylation, dehydration (resulting in inner anhydride formation), ammonolysis of the inner anhydride and esterification of the resultant isomeric monoamides. This process and the products resulting therefrom, constitute the subject matter of copending United States application, S. N. 415,435, filed concurrently herewith by Safir and Hlavka.

The bases suitable for the purpose of effecting ring-formation in the process of this invention are alkali metal alcoholates, for instance sodium methoxide, sodium ethoxide, sodium isopropoxide; alkali metal amides, for instance sodamide; and the alkali metals, for instance metallic sodium and lithium.

The 4 - carbobenzyloxy - 3,3 - dimethyl piperazinedione formed as a result of the cyclization is in itself an effective anaesthetic and anti-convulsant agent. Other groups however, may be conveniently substituted in its place to obtain a variety of equally efficacious medicinal compounds. This may be suitably accomplished by the removal of the carbobenzyloxy group through catalytic hydrogenolysis by treatment with hydrogen and palladium-charcoal catalyst. The resulting 3,3-dimethyl piperazine-dione then readily accepts various substituents in the $N^4$ position.

The introduction of substituents into the $N^4$ position of the piperazinedione ring following removal of the blocking group may be effected by various methods. Using the acylation technique for example, the piperazine-dione dissolved in a suitable inert organic solvent such as acetone, benzene, chloroform or dimethylformamide is reacted with the corresponding acid chloride, to obtain substitution of the desired radical. Other methods for placing substituents on the $N^4$ position may be variously employed by those skilled in the art.

The following examples will serve to describe more particularly the invention contemplated by this disclosure although it is not intended that such examples be construed as limitations upon the scope thereof. All parts are by weight unless otherwise indicated.

Example I 0.195 gram of sodium methoxide was added to 1 gram of the isomeric monoester-monoamides of α-[(N-carbobenzyloxy-N-carboxmethyl)-amino]-isobutyric acid in 8 ml. of methanol. The resulting mixture was concentrated to dryness under reduced pressure. A cold mixture of 2 ml. of 2N hydrochloric acid and 10 ml. of water was added to the solid residue. The insoluble oil was extracted with ethyl acetate. The ethyl acetate extract was dried over magnesium sulfate and concentrated to dryness under reduced pressure. The crude residue was recrystallized from isopropyl alcohol to yield 4 - carbobenzyloxy - 3,3 - dimethyl - 2,6 - piperazine-- dione melting at 114–116° C.

Example II

One gram of 4-carbobenzyloxy-3,3-dimethyl-2,6-piperazinedione was dissolved in 50 ml. of ethanol, and 1 gram of palladium-charcoal catalyst was added. Hydrogen gas was bubbled through the stirred mixture until carbon dioxide was no longer evolved. The catalyst was removed by filtration, and the filtrate was concentrated to dryness under reduced pressure. The crude residue was recrystallized from isopropyl alcohol to yield 3,3-dimethyl-2,6-piperazinedione melting at 137–139° C.

Example III 1.2 grams of phenoxyacetyl chloride was added to a solution of 2 grams of 3,3-dimethyl-2,6-piperazinedione in 25 ml. of acetone. The resulting crystalline 3,3-dimethyl-2,6-piperazinedione hydrochloride was removed by filtration, and the filtrate was concentrated to dryness under reduced pressure. The crude residue was recrystallized from ethanol to give 1.3 grams of 4-phenoxyacetyl-3,3-dimethyl-2,6-piperazinedione melting at 133–135° C.

Example IV 1.2 grams of β-phenylpropionyl chloride was added to a solution of 2.0 grams of 3,3-dimethyl-2,6-piperazinedione in 20 ml. of acetone. The resulting crystalline 3,3-dimethyl-2,6-piperazine hydrochloride was removed by filtration, and the filtrate was concentrated to dryness under reduced pressure. The crude residue was recrystallized from ethanol to yield the pure 4-(β-phenylpropionyl)-3,3-dimethyl-2,6-piperazinedione, melting at 149°–150° C.

*Example V*

2.1 grams of dichloroacetyl chloride was added to a solution of 4.0 grams of 3,3-dimethyl-2,6-piperazinedione in 40 ml. of acetone. The resulting crystalline 3,3-dimethyl-2,6-piperazine hydrochloride was removed by filtration, and the filtrate was concentrated to dryness under reduced pressure. The crude residue was recrystallized from ethanol to give the pure 4-dichloroacetyl-3,3-dimethyl-2,6-piperazinedione melting at 175–177° C.

*Example VI*

1.2 grams of ethyl chloroformate was added to a solution of 3.0 grams of 3,3-dimethyl-2,6-piperazinedione in 30 ml. of acetone. The resulting crystalline 3,3-dimethyl-2,6-piperazine hydrochloride was removed by filtration, and the filtrate was concentrated to dryness under reduced pressure. The crude residue was recrystallized from ethanol to give grams of 4-carbethoxy-3,3-dimethyl-2,6-piperazinedione melting at 99°–102° C.

We claim:
1. Compounds having the general formula

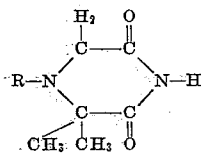

wherein R is a member selected from the group consisting of carbobenzyloxy, phenoxyacetyl, beta-phenylpropionyl, dichloroacetyl and carbethoxy radicals.

2. 4-carbobenzyloxy-3,3-dimethyl-2,6-piperazinedione.

3. 4-phenoxyacetyl-3,3-dimethyl-2,6-piperazinedione.

4. 4-(β-phenylpropionyl)-3,3-dimethyl-2,6-piperazinedione.

5. 4-dichloroacetyl-3,3-dimethyl-2,6-piperazinedione.

6. 4-carbethoxy-3,3-dimethyl-2,6-piperazinedione.

7. A method for preparing compounds having the general formula:

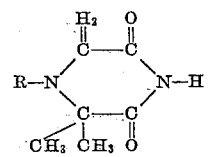

wherein R is a member selected from the group consisting of hydrogen atoms, carbobenzyloxy, phenoxyacetyl, beta-phenylpropionyl, dichloroacetyl and carbethoxy radicals; which comprises reacting the isomeric monomethyl ester-monoamides of α-[(N-carbobenzyloxy-N-carboxymethyl)-amino]-isobutyric acid with a strong base, reducing the resultant 4-carbobenzyloxy-3,3-dimethyl-2,6-piperazinedione by treatment with hydrogen and palladium-charcoal catalyst, then acylating the 3,3-dimethyl-2,6-piperazinedione so obtained.

8. The method of claim 7 wherein the strong base is an alkali metal alcoholate.

9. In a method for preparing compounds having the general formula:

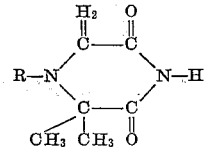

wherein R is a member of the group consisting of hydrogen atoms, carbobenzyloxy, phenoxyacetyl, beta-phenylpropionyl, dichloroacetyl and carbethoxy radicals; the step of reacting the isomeric monomethyl ester-monoamides of α-[(N-carbobenzyloxy-N-carboxymethyl)-amino]-isobutyric acid with a strong organic base.

10. A method for preparing 4-carbobenzyloxy-3,3-dimethyl-2,6-piperazinedione which comprises treating the isomeric monomethyl ester-monoamides of α-[(N-carbobenzyloxy - N - carboxymethyl) - amino] - isobutyric acid with an alkali metal alcoholate.

11. A method for preparing 3,3-dimethyl-2,6-piperazinedione which comprises treating 4-carbobenzyloxy-3,3-dimethyl-2,6-piperazinedione with hydrogen and palladium-charcoal catalyst.

12. A method for preparing 4-phenoxyacetyl-3,3-dimethyl-2,6-piperazinedione, which comprises treating 3,3-dimethyl-2,6-piperazinedione with phenoxyacetyl chloride.

13. A method for preparing 4-β-phenylpropionyl-3,3-dimethyl-2,6-piperazinedione which comprises treating 3,3-dimethyl-2,6-piperazinedione with β-phenylpropionyl chloride.

14. A method for preparing 4-dichloroacetyl-3,3-dimethyl-2,6-piperazinedione which comprises treating 3,3-dimethyl-2,6-piperazine with dichloroacetyl chloride.

15. A method for preparing 4-carbethoxy-3,3-dimethyl-2,6-piperazinedione, which comprises treating 3,3-dimethyl-2,6-piperazinedione with ethyl chloroformate.

References Cited in the file of this patent

Dubsky et al.: Ber. Deut. Chem. 66, 1497–98 (1933).
Dunn et al.: Can. J. Research 26B, 114–137 (1948).